Patented Aug. 6, 1946

2,405,276

UNITED STATES PATENT OFFICE 2,405,276

PROCESS FOR THE TREATMENT OF WATER BY SUPPRESSING THE IONS OF ALKALINE EARTH METALS

Ambrose George Taylor, Birmingham, England, assignor to Calgon, Inc., Pittsburgh, Pa.

No Drawing. Application April 16, 1941, Serial No. 388,818. In Great Britain May 6, 1940

26 Claims. (Cl. 210—23)

The invention relates primarily to the treatment of water intended to be used for domestic purposes or in industrial processes or in steam production, and in which the concentration of calcium and/or magnesium ions is sufficiently great to exercise an adverse effect upon the use of the water.

The object of the invention is to improve the condition of the water by reducing the concentration of free calcium and/or magnesium ions. A further object is to take into solution unwanted deposits or scale consisting of calcium and/or magnesium compounds, using water without addition of acids. The method by which the invention achieves the first mentioned object is by the addition to the water to be treated of alkali metal metaphosphate preparations derived from the water-insoluble varieties of alkali metal metaphosphates, and the method by which the invention achieves the further object is by treatment of the deposits of calcium and/or magnesium compounds with water containing water-insoluble alkali metal metaphosphates or preparations derived therefrom. Typical of the water-insoluble alkali metal metaphosphates in question are Maddrell salt (of sodium) (vide Chemical Society Annual Reports, 1937, p. 116) and Kurrol salts (of sodium or of potassium) (ibid. p. 118).

Maddrell salt is formed by the removal of the elements of water from monosodium orthophosphate by the action of heat below approximately 500° C. It is generally accepted that this salt is not a single form but rather a mixture of at least two closely similar water-insoluble forms which have not as yet been clearly characterised. As shown by Paul Pascal, in his paper entitled "Research on the Metaphosphates" (second note), Bull. Soc. Chim. 1924, 35, pages 1122 to 1124, the insoluble sodium metaphosphate or Maddrell salt may be prepared by heating monosodium orthophosphate to temperatures in the range from 250° C. to about 505° C. but not above. At the lower temperatures, the monosodium orthophosphate must be heated for longer periods of time than at the higher temperature in order to obtain a sodium metaphosphate or Maddrell salt which is 100% insoluble or substantially so. According to the data on page 1122 of the above mentioned Pascal paper, monosodium orthophosphate must be heated for 300 hours at 252° C. in order to obtain 100% insoluble sodium metaphosphate, and that the insoluble metaphosphate may also be obtained by heating for 142 hours at 281° C., for 77 hours at 320° C., and for 2 hours at 355° C. When the monosodium orthophosphate is heated to above 500° C., the yield of insoluble metaphosphate rapidly decreases to nothing, the resulting product being sodium trimetaphosphate which is water soluble and is characterized by its inability to form a precipitate with metallic salts.

It has been reported (vide Pascal, Bull. Soc. Chim., 1924, 35, 1119) that the Kurrol salt of sodium can be formed by crystallisation from molten sodium metaphosphate.

With regard to the Kurrol salt of potassium, it is already known that potassium metaphosphate is readily obtained in a range of closely similar water-insoluble forms by removal of the elements of water from monopotassium phosphate by the action of heat above approximately 250° C., or by cooling molten potassium metaphosphate. All these water-insoluble forms of potassium metaphosphate are usually designated in the literature as potassium Kurrol salt (vide Pascal, Bull. Soc. Chim., 1924, 35, 1119).

According to the aforesaid bulletin, Pascal reported that sodium Kurrol salt could be prepared by rapidly heating Maddrell salt to fusion from which the hexametaphosphate is formed on quick cooling. By slowly cooling from the fused state, a glassy or crystalline mass forms, which, for the most part, is insoluble in water. When crystallization does not occur, the presence of the insoluble salt is indicated by the fineness of the cracks and the milky appearance of the glassy mass. It is this insoluble form of sodium metaphosphate that is called sodium Kurrol salt by Pascal. The sodium Kurrol salt may be prepared also by gently heating small quantities of sodium monoethyl phosphate. This salt swells, gives off combustible vapors and leaves a porous material the fusion of which is avoided for fear of reversion toward the insoluble forms. This porous material should be pulverized and washed freely over a vacuum filter in order to carry away the soluble metaphosphates which might dissolve the insoluble substance. After having been dried in a dry vacuum, the product is homogeneous, it fuses at 809°–811° C., giving upon cooling confused crystals which are sharply fusible at 811° C., or 170° C. above the fusion temperature for hexametaphosphate.

The viscosity of the solutions is not constant on account of the existence of several varieties of Kurrol salts, which are changed from one form into another by a variation in temperature. Because of the slowness of the phenomenon, the pure varieties may be prepared by rapid quenching after having been kept at a fixed temperature. When the above described material, after having been washed and dried, is heated to, and held at, a temperature of from 500° C. to 550° C. for periods of time varying from 25 to 120 minutes, and is then quickly quenched from this temperature, the insoluble Kurrol salt is obtained and shows a relatively low viscosity in a solution of 2N/100 of insoluble material and N/10 in hexametaphosphate. This characteristic remains the same so long as the temperature from which the material is quenched does not reach, or attain, a value of from 590°–600° C.

It has long been known (vide Pascal, Bull. Soc. Chim., 1924, 35, 1131) that sodium and potassium Kurrol salts dissolve in aqueous solutions of tetrasodium pyrophosphate, sodium hexametaphosphate (Graham's salt) and sodium trimetaphosphate. I have now found that all water-insoluble forms of sodium metaphosphate will dissolve in aqueous solutions of potassium salts and in aqueous solutions of ammonium salts, i. e. in aqueous solutions containing potassium or ammonium cations irrespective of the nature of the anions.

I have found that there also exists a dissolving influence of water-insoluble sodium metaphosphate and water-insoluble potassium metaphosphate upon one another in the presence of water as a result of which the two water-insoluble substances become dissolved jointly. This phenomenon is shown by mixing any water-insoluble sodium metaphosphate with any water-insoluble potassium metaphosphate, and adding water; the mixing may be effected by any ordinary mechanical method and I prefer this method.

Sodium Kurrol salt, prepared by crystallisation from a melt, is referred to in the literature as "insoluble." I have found, however, that although apparently insoluble as judged by appearance when stirred for a short time with water, it is in reality not insoluble. When crystals of sodium Kurrol salt are kept in contact with cold water they slowly swell and become gelatinous and later give a viscous solution. However, sodium Kurrol salt is made to dissolve most conveniently by warming it with an aqueous solution containing potassium or ammonium cations irrespective of the nature of the anions. It is to be noted that Maddrell salt differs from sodium Kurrol salt by not swelling in water alone and by dissolving more slowly than the Kurrol salt in the presence of potassium ions, the comparison being made at the same temperature for both. I use the term "water-insoluble alkali metal metaphosphates" for convenience, in spite of the above described behaviour of sodium Kurrol salt.

Potassium Kurrol salt, prepared by crystallisation from a melt, does not show to a noticeable extent the swelling in water alone. All water-insoluble forms of potassium metaphosphate will, however, dissolve in aqueous solutions containing other univalent cations, for instance sodium ions or ammonium ions.

While some of these solutions of water-insoluble alkali metal metaphosphates are readily obtained in the cold, others are more conveniently prepared by warming the water-insoluble metaphosphate or metaphosphates in the presence of the appropriate aqueous medium.

It is already known that the insoluble Kurrol metaphosphates of sodium and potassium when dissolved in aqueous solutions of pyrophosphates or hexametaphosphates give rise to solutions of notable viscosity (vide Pascal, Bull. Soc. Chim., 1924, 35, 1119). Solutions of high viscosity may also be obtained by dissolving these Kurrol salts in other aqueous solutions containing alkali metal or ammonium ions irrespective of the nature of the anion. As already stated, I have found that sodium Kurrol salt gives a viscous solution with water alone. I have also found that all these viscous solutions undergo a slow change on standing and a very much more rapid change on heating, which is characterized by a large reduction in the viscosity.

I have found that the water-insoluble forms of sodium and potassium metaphosphate when dissolved as already described, have the power of combining with calcium and magnesium ions to form complexes of great stability. This property is characteristic of solutions in a viscous state as above described and also of solutions in a non-viscous state.

The metaphosphate materials with which the invention is carried into effect include solid sodium Kurrol salt or a solution thereof in water, solid mixtures of water-insoluble sodium and/or potassium metaphosphates with alkali metal or ammonium salts, mixtures of water-insoluble sodium and potassium metaphosphates which will dissolve jointly as already mentioned, solutions derived from any of the foregoing mixtures of salts, and also solid preparations derived in an obvious manner, for example, by evaporation to dryness of these solutions. The water-insoluble metaphosphates may also be used singly and without admixture with other salts if the water to be treated already contains sufficient univalent cation to bring them into solution.

Having regard to the foregoing, the present invention consists broadly in eliminating from water the undesirable properties associated with the presence of calcium and/or magnesium ions by adding to the water any of the aforesaid materials. In particular the precipitation of insoluble calcium and magnesium salts, e. g. lime soaps or calcium and magnesium carbonates can be prevented in this way. It is also possible to dissolve and hold in solution by means of these preparations calcium and magnesium salts having even very low solubility products.

I am aware that water-insoluble alkali metal metaphosphates can be dissolved in dilute solutions of strong acids and that the acid solutions obtained can be neutralised by addition of alkali metal and that the alkali metaphosphate formed can be held in solution by sufficient dilution with water. Moreover, it has been stated in United States Patent 2,130,557 (Casimir J. Munter) that if Maddrell salt or Kurrol salt is dissolved in strong acid without heating, the effectiveness of the solution obtained by subsequent neutralization is from 25% to 50% as great for repressing the concentration of calcium ions as the effectiveness of a solution in which all the metaphosphate is present as hexametaphosphate, the comparison being on the basis of the metaphosphate required to eliminate a given quantity of calcium ions. In contrast with this, it is shown in examples hereinafter given, that the preparations I have described derived from water-insoluble sodium and potassium metaphosphates are quite as effective as sodium hexametaphosphate (Graham's salt) in repressing calcium ions. In view of the foregoing I specifically exclude from the scope of the invention herein claimed solutions derived from water-insoluble alkali metal metaphosphates by dissolving in strong acids, with or without subsequent neutralisation.

It is well known that another variety of sodium metaphosphate, the glassy form commonly called Graham's salt or sodium hexametaphosphate, dissolves freely in water to give solutions which have the power of reacting with free calcium or magnesium ions to form soluble complexes, and extensive use is made of this property for water treatment, but I have found that the preparations derived from water-insoluble sodium and potassium metaphosphates which are the basis of the invention differ in an important respect from Graham's salt. Whereas solutions of Graham's salt are rapidly hydrated at the boiling point to orthophosphate, the solutions containing the preparations derived from water-insoluble sodium and potassium metaphosphates, which are the basis of the invention, are at elevated temperatures much more stable and maintain their property of repressing calcium and magnesium ions concentrations by stable soluble complex formation for long periods at the boiling point. This property of stability at high temperatures renders these preparations particularly suitable for addition to water being supplied to steam boilers in order to prevent feed line deposits or to dissolve existing deposits.

An additional advantage which solid preparations derived from water-insoluble sodium and potassium metaphosphates have is that unlike Graham's salt they are non-hygroscopic and may be exposed to a damp atmosphere without deterioration.

The following examples show the calcium ion and magnesium ion repressing power of preparations obtained as already described from water-insoluble alkali metaphosphates. In Examples 1, 2, 3 and 4, the method of test was as follows:

The water-insoluble alkali metaphosphate preparation was made up to contain 8 gms. per litre of $NaPO_3$, or the equivalent weight 9.25 gms. per litre of $KPO_3$. The metaphosphate solutions were gradually added to 50 ml. of an aqueous solution containing 5 mgm. of calcium ions, or 5 mgm. of magnesium ions, at 18° C. The volume required to reduce the concentration of calcium or magnesium ions to such an extent that a permanent lather (i. e. a lather persisting for at least five minutes) can just be obtained with standard soap solution is an inverse measure of the calcium or magnesium ion repressing power of the metaphosphate preparation. The pH of the solution just before the addition of the soap solution was adjusted so that it was very faintly pink to phenolphthalein. For comparison with the volumes quoted below, the number of ml. of an equivalent solution of sodium hexametaphosphate (Graham's salt) required is 9.0 ml. for 5 mgm. of calcium ions.

Example 1

A solution of water-insoluble potassium metaphosphate was prepared in 1% sodium nitrate solution. The solution was boiled to render it non-viscous and tested as described above.

The volume required for 5 mgm. calcium ions=9.0 ml.
The volume required for 5 mgm. magnesium ions=10.0 ml.

Potassium metaphosphates prepared by heating monopotassium phosphate at different temperatures to convert it to metaphosphate, or by cooling molten potassium metaphosphate, gave closely similar results.

Example 2

A solution of sodium Kurrol salt in 1% potassium nitrate, and tested as described above, gave the following results:

The volume required for 5 mgm. calcium ions=9.5 ml.
The volume required for 5 mgm. magnesium ions=9.5 ml.

Example 3

A solution of Maddrell salt was prepared by adding 8 gms. of the salt to 1 litre of a boiling solution of potassium carbonate containing 14.0 gms. of $K_2CO_3$. The Maddrell salt went completely into solution in a few minutes. The solution was cooled and tested as described above.

The volume required for 5 mgm. calcium ions=9.0 ml.
The volume required for 5 mgm. magnesium ions=10.0 ml.

Example 4

A metaphosphate solution was prepared by dissolving 4.0 gms. sodium Kurrol salt and 4.62 gms. potassium Kurrol salt in 1 litre of water. The solution was made slightly alkaline and boiled to render it non-viscous. It was then tested as described above.

The volume required for 5 mgm. calcium ions=9.0 ml.
The volume required for 5 mgm. magnesium ions=10.0 ml.

Example 5

The stability of slightly alkaline solutions of potassium and sodium Kurrol salts is shown by the following experiment:

8 gms. of sodium Kurrol salt were dissolved in 1 litre of 0.65% potassium carbonate solution. 9.2 gms. of potassium Kurrol salt were dissolved in 1 litre of 0.5% sodium carbonate solution. These solutions were boiled under reflux for 6 hours and at the end of this time the percentage of metaphosphate which had not been changed to ortho- or pyrophosphate was determined. In the case of the Kurrol salt of potassium or of sodium, approximately 80% of the phosphate was still present as metaphosphate, whereas under the same conditions and in the same time Graham's salt was hydrated to the extent of approximately 75%.

Example 6

A solution of Maddrell salt was prepared by dissolving 8 gms. of the salt in 1 litre of a boiling solution of potassium chloride containing 14 gms. of KCl. 200 ml. of a solution of calcium chloride containing 0.1 gms. of calcium ion per litre were boiled, and 10 ml. of a solution of sodium oxalate containing 6.7 gms. per litre were added. Calcium oxalate was immediately precipitated. The suspension was kept boiling and the solution of Maddrell salt run in from a burette until the calcium oxalate had completely dissolved. The volume of metaphosphate solution required was not greater than 36 ml.

The following may be cited as illustrative examples of the application of the invention:

In the softening of water by the lime-soda process as ordinarily carried out, the residual hardness of the water is usually such that the total hardness (calcium and magnesium) is equivalent to about two parts $CaCO_3$ per 100,000 of water. Water of this hardness reacts with soap and precipitates insoluble calcium and magnesium soaps. This disadvantageous result can be avoided by addition of water-insoluble potassium metaphosphate to the stock soap solution made up for use in washing machines. A soap solution which contains 2 oz. of soap per gallon of water of the above mentioned hardness can be used as the stock solution, subsequently to be mixed with four times its own volume of water of the above mentioned hardness; the addition of 0.08 oz. of potassium metaphosphate, which dissolves readily in the soap solution on account of the sodium cation therein, is sufficient to prevent the formation of insoluble calcium and magnesium soaps, at 80°–100° C. which is the temperature ordinarily employed for washing in a washing machine.

A further illustration is the following:

In laundry practice it is important to ensure that deposition of calcium or magnesium soaps does not occur at the rinsing stage. The water used in this operation may be softened by adding thereto a solution obtained by dissolving 2½ lbs. sodium Kurrol salt and 5 lbs. potassium sulphate in 10 gallons of water. If the water to be softened contains 2 parts per 100,000 of calcium hardness (expressed as CaCO₃) the amount of solution required to treat 1,000 gallons will be 2.88 gallons.

A further illustration is the following:

As has already been stated above, the stability at elevated temperatures against hydration to orthophosphate of solutions of water-insoluble alkali metal metaphosphates is a valuable property when they are used in the conditioning of boiler feed water to keep the feed lines free from deposited calcium salts. Consider a boiler taking 100,000 lbs. per hour of feed water which has been softened by a lime-soda process and contains 1.1 parts per 100,000 of calcium hardness and 0.4 part per 100,000 of magnesium hardness; the blowdown is assumed to amount to 10%; the requirement of metaphosphate is 1.27 lbs. of potassium metaphosphate or 1.1 lbs. sodium metaphosphate per 100,000 lbs. of feed water. Sufficient of a stock solution of metaphosphate to treat 400,000 lbs. of water is run into the boiler feed water every four hours, the addition being completed in five minutes. The stock solution may be made up by dissolving 10 lbs. potassium metaphosphate and 10 lbs. sodium sulphate in 50 gallons of water. Alternatively, a solution prepared by heating 7 lbs. 5 ozs. potassium metaphosphate and 2 lbs. 11 ozs. Maddrell salt with 50 gallons of water may also be used.

What I claim is:

1. The process of softening water by adding to it a metaphosphate solution in sufficient amount to soften the water, said metaphosphate solution being obtained by dissolving the form of sodium metaphosphate usually referred to as Maddrell salt in an aqueous solution containing potassium ions.

2. The process as in claim 1, in which potassium ions are replaced, at least in part, by ammonium ions.

3. The process of softening water by adding to it the form of sodium metaphosphate usually referred to as Maddrell salt and also a potassium salt, said Maddrell salt being added in amount sufficient to soften the water.

4. The process as in claim 3, in which a potassium salt is replaced, at least in part, by an ammonium salt.

5. The process of softening water by adding to it a metaphosphate solution in sufficient amount to soften the water, said metaphosphate solution being obtained by dissolving the form of potassium metaphosphate usually referred to as potassium Kurrol salt in an aqueous solution containing sodium ions.

6. The process of softening water by adding to it a metaphosphate solution in sufficient amount to soften the water, said metaphosphate solution being obtained by dissolving the form of potassium metaphosphate usually referred to as potassium Kurrol salt in an aqueous solution containing ammonium ions.

7. The process of softening water by adding to it a metaphosphate solution in sufficient amount to soften the water, said metaphosphate solution being obtained by dissolving the form of potassium metaphosphate usually referred to as potassium Kurrol salt in an aqueous solution containing sodium and ammonium ions.

8. The process of softening water by adding to it potassium Kurrol salt in solid form, and in addition a salt of sodium, said Kurrol salt being in amount sufficient to soften the water.

9. The process of softening water by adding to it potassium Kurrol salt in solid form, and in addition a salt of ammonium, said Kurrol salt being in amount sufficient to soften the water.

10. The process of softening water by adding to it an amount, sufficient to soften the water, of a metaphosphate solution containing both potassium Kurrol salt and Maddrell salt.

11. The process of softening water in which potassium Kurrol salt is added to the water to be treated together with sodium Kurrol salt, said Kurrol salts being added in amount sufficient to soften the water.

12. The process of softening water in which potassium Kurrol salt is added to the water to be treated together with Maddrell salt, the Kurrol and Maddrell salts being added in amount sufficient to soften the water.

13. A water softening composition comprising a water-insoluble sodium metaphosphate in an aqueous solution containing potassium ions.

14. A water softening composition comprising a water-insoluble sodium metaphosphate in an aqueous solution containing ammonium ions.

15. A water softening composition comprising a water-insoluble potassium metaphosphate in an aqueous solution of sodium nitrate.

16. A mixture of effective amounts of water-insoluble sodium and potassium metaphosphates characterized by the fact that when such mixture is added to water which is heated, a reaction takes place resulting in the dissolving of the sodium and potassium metaphosphates, whereby the resulting aqueous solution exhibits the property of softening water by repression of the calcium and magnesium ions, and of dissolving calcium and magnesium salts such as calcium and magnesium soaps.

17. A mixture of effective amounts of solid water-insoluble sodium and potassium metaphosphates and sodium and potassium carbonates characterized by the fact that when such mixture is added to water a reaction takes place resulting in the dissolving of the sodium and potassium metaphosphates in the water to form a solution which exhibits the property of softening water in a manner typical of sodium phosphate glass of the Graham's salt type, of dissolving calcium and magnesium soaps, and of having a stable calcium repression after boiling for a period of time exceeding several hours.

18. A composition comprising effective amounts of water-insoluble sodium metaphosphate and potassium carbonate, which mixture when added to water in a concentration of 8 grams of water-insoluble sodium metaphosphate per liter of water, is characterized by the fact that a reaction between the carbonate and the metaphosphate occurs whereby the metaphosphate dissolves to produce an aqueous solution that exhibits the property of softening water against soap, and of resisting reversion of the metaphosphate to orthophosphate at boiling temperature for a substantially longer period of time than an equivalent solution of Graham's salt will resist reversion at the same temperature.

19. A composition comprising effective amounts of water-insoluble sodium metaphosphate and potassium chloride, which mixture when added to water in concentrations of 8 grams of water-insoluble sodium metaphosphate per liter of water is characterized by the fact that a reaction between the potassium chloride and the metaphosphate occurs whereby the metaphosphate is dissolved, the rate of solution being relatively slow at room temperature and relatively rapid at temperatures up to and including 100° C., which solution on dissolution of the metaphosphate has the property of softening hard water against soap when added to hard water in the ratio of about 9 to 10 milliliters per 5 milligrams of calcium ion or magnesium ion.

20. A composition comprising a mixture of water-insoluble sodium metaphosphate and potassium carbonate in the ratio of about 8 grams of metaphosphate to about 14 grams of potassium carbonate, which mixture when added to water and boiled is characterized by a chemical reaction that results in relatively rapid dissolution of the metaphosphate, which solution, when the metaphosphate is dissolved, has the property of softening water containing calcium or magnesium ion, about 9 to 10 milliliters of the phosphate carbonate solution being required to soften a water containing about 5 milligrams of calcium ion.

21. A composition comprising a mixture of water-insoluble sodium metaphosphate and water-insoluble potassium metaphosphate in the ratio of 4 grams of water-insoluble sodium metaphosphate to 4.62 grams of water-insoluble potassium metaphosphate, which mixture when added to water in the ratio of about 8.62 grams per liter of water, and boiled is characterized by relatively rapid dissolution of the metaphosphates and the formation of a solution having the property of softening hard water against soap and having a softening efficiency substantially equal to an equivalent amount of Graham's salt.

22. A composition comprising a mixture of water-insoluble sodium metaphosphate and potassium carbonate, the amount of carbonate being such as to form about 0.65% solution when said mixture is added to water in the ratio of 8 grams of metaphosphate per liter of water, said mixture of metaphosphate and carbonate being characterized by the fact that the metaphosphate is solubilized by the carbonate and that the resulting solution will soften water and that its ability to soften water remains substantially unchanged when boiled under reflux for a period of about six hours.

23. A composition comprising a mixture of water-insoluble potassium metaphosphate and sodium carbonate, the amount of carbonate being such as to form about a 0.50% solution when said mixture is added to water in the ratio of 9.2 grams of metaphosphate per liter of water, said mixture of metaphosphate and carbonate being characterized by the fact that the metaphosphate is solubilized by the carbonate and that the resulting solution will soften water and that its ability to soften water remains substantially unchanged when boiled under reflux for a period of about six hours.

24. A composition comprising a mixture of water-insoluble sodium metaphosphate and a water-soluble compound selected from the group consisting of potassium and ammonium salts, the water-soluble compound in said mixture being in amount sufficient to cause dissolution of the water-insoluble sodium metaphosphate when said mixture is added to water, and to impart to said phosphate properties characteristic of Graham's salt with respect to calcium and magnesium ions.

25. A composition comprising a mixture of water-insoluble potassium metaphosphate and a water-soluble compound selected from the group consisting of sodium and ammonium salts, the amount of water soluble compound in said mixture being such as to form a concentration of about a 0.5% solution when said mixture is added to water in the ratio of about 9 grams of potassium metaphosphate per liter of water, the water soluble compound causing said potassium metaphosphate to dissolve when said mixture is added to water and to impart to said dissolved phosphate properties characteristic of Graham's salt with respect to calcium and magnesium ions.

26. A composition according to claim 25 in which the sodium and ammonium salts are alkaline, characterized by the fact that said alkaline salts impart greater resistance against reversion of the dissolved phosphate to orthophosphate when aqueous solutions of the mixture are heated to temperatures up to boiling.

AMBROSE GEORGE TAYLOR.